United States Patent
Asada et al.

(10) Patent No.: US 9,840,095 B2
(45) Date of Patent: Dec. 12, 2017

(54) IMAGE RECORDING DEVICE

(71) Applicant: BROTHER KOGYO KABUSHIKI KAISHA, Nagoya-shi, Aichi-ken (JP)

(72) Inventors: Tetsuo Asada, Nagoya (JP); Hirotaka Aoki, Nagoya (JP); Satoru Nakakita, Nagoya (JP); Shota Iijima, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/405,910

(22) Filed: Jan. 13, 2017

(65) Prior Publication Data

US 2017/0120633 A1 May 4, 2017

Related U.S. Application Data

(63) Continuation of application No. 15/062,647, filed on Mar. 7, 2016, now Pat. No. 9,545,798, which is a
(Continued)

(30) Foreign Application Priority Data

Jan. 29, 2010 (JP) ................................. 2010-018605

(51) Int. Cl.
*B41J 11/58* (2006.01)
*B41J 11/00* (2006.01)

(52) U.S. Cl.
CPC ............ *B41J 11/58* (2013.01); *B41J 11/0045* (2013.01)

(58) Field of Classification Search
CPC ........ B41J 11/007; B41J 3/4075; B41J 11/58; B41J 11/0045; B41J 11/006; B41J 11/065;
(Continued)

(56) References Cited

U.S. PATENT DOCUMENTS

| | | |
|---|---|---|
| 4,786,039 A | 11/1988 | Ito |
| 5,132,741 A | 7/1992 | Kitajima et al. |

(Continued)

FOREIGN PATENT DOCUMENTS

| | | |
|---|---|---|
| CN | 1119991 A | 4/1996 |
| CN | 1501185 A | 6/2004 |

(Continued)

OTHER PUBLICATIONS

United States Notice of Allowance dated Apr. 18, 2013 received in parent U.S. Appl. No. 12/892,377.

(Continued)

*Primary Examiner* — Kristal Feggins
(74) *Attorney, Agent, or Firm* — Scully, Scott, Murphy & Presser, P.C.

(57) ABSTRACT

An image reading device includes a tray unit, a recording unit disposed above the tray unit, an outer guide defining a curved path extending from the tray unit to the recording unit, a sheet feeder configured to feed a sheet from the tray unit to the curved path, and a return guide disposed between the recording unit and the tray unit. The return guide pivots about a shaft and guides the sheet having an image recorded thereon back to the curved path. The tray unit includes at least one supporting portion. The return guide includes at least one supported portion. The at least one supporting portion of the tray unit engages the at least one supported portion of the return guide such that the return guide takes a guiding position in which the return guide defines a return path extending to the curved path.

11 Claims, 10 Drawing Sheets

Related U.S. Application Data continuation of application No. 13/960,306, filed on Aug. 6, 2013, now Pat. No. 9,278,558, which is a continuation of application No. 12/892,377, filed on Sep. 28, 2010, now Pat. No. 8,508,819.

(58) Field of Classification Search
CPC ... B41J 15/00; B41J 15/16; B41J 17/20; B41J 13/0054; B41J 13/103; B41J 13/106; B41J 13/12; B41J 13/18; B41J 13/223; B41J 13/226; B41J 13/24; B41J 13/32; B41J 15/044; B41J 15/048; B41J 15/18; B41J 17/02; B41J 17/18; B65H 75/241
See application file for complete search history.

(56) References Cited

U.S. PATENT DOCUMENTS

| | | | |
|---|---|---|---|
| 5,284,333 A | 2/1994 | Ishikawa | |
| 5,351,112 A | 9/1994 | Naito et al. | |
| 5,364,195 A | 11/1994 | Kanemitsu et al. | |
| 5,408,301 A | 4/1995 | Tokishige et al. | |
| 5,791,645 A | 8/1998 | Takada | |
| 5,799,237 A | 8/1998 | Ueda et al. | |
| 5,953,575 A | 9/1999 | Park et al. | |
| 6,078,345 A | 6/2000 | Yamakawa et al. | |
| 6,088,135 A | 7/2000 | Kusumoto | |
| 6,126,347 A | 10/2000 | Sakaino et al. | |
| 6,152,561 A | 11/2000 | Watanabe | |
| 6,293,716 B1 | 9/2001 | Driggers et al. | |
| 6,722,439 B2 | 4/2004 | Garay et al. | |
| 6,805,198 B2 | 10/2004 | Huang et al. | |
| 6,909,872 B2 | 6/2005 | Eskey | |
| 7,243,728 B2 | 7/2007 | Stoesz et al. | |
| 7,258,335 B2 | 8/2007 | Johnson et al. | |
| 7,374,281 B2 | 5/2008 | Saito et al. | |
| 7,413,183 B2 | 8/2008 | Asada et al. | |
| 7,437,119 B2 | 10/2008 | Takemoto et al. | |
| 7,469,981 B2 | 12/2008 | Katsuyama et al. | |
| 7,527,264 B2 | 5/2009 | Terada | |
| 7,717,423 B2 | 5/2010 | Litman et al. | |
| 7,778,572 B2 | 8/2010 | Iijima | |
| 7,850,299 B2 | 12/2010 | Hiroki et al. | |
| 7,887,044 B2 | 2/2011 | Uchino et al. | |
| 7,959,147 B2 | 6/2011 | Izuchi et al. | |
| 8,087,769 B2 | 1/2012 | Hiroki et al. | |
| 8,127,856 B1 | 3/2012 | Nish et al. | |
| 8,144,374 B2 | 3/2012 | Taniguchi | |
| 8,152,161 B2 | 4/2012 | Samoto et al. | |
| 8,152,169 B2 | 4/2012 | Samoto et al. | |
| 8,152,391 B2 | 4/2012 | Asada | |
| 8,172,225 B2 | 5/2012 | Tanahashi | |
| 8,208,180 B2 | 6/2012 | Osakabe et al. | |
| 8,240,655 B2 | 8/2012 | Samoto et al. | |
| 8,289,589 B2 | 10/2012 | Matsushima | |
| 8,493,639 B2 | 7/2013 | Samoto et al. | |
| 8,508,819 B2 | 8/2013 | Asada et al. | |
| 8,764,006 B2 | 7/2014 | Samoto et al. | |
| 8,768,235 B2 | 7/2014 | Asada et al. | |
| 9,045,302 B2 | 6/2015 | Asada et al. | |
| 9,049,326 B2 | 6/2015 | Miura et al. | |
| 9,051,144 B2 | 6/2015 | Asada et al. | |
| 9,085,430 B2 | 7/2015 | Samoto et al. | |
| 9,283,778 B2 | 3/2016 | Asada et al. | |
| 9,440,460 B2 | 9/2016 | Asada et al. | |
| 9,452,619 B2 | 9/2016 | Asada et al. | |
| 2001/0017439 A1 | 8/2001 | Hiramatsu | |
| 2004/0086310 A1 | 5/2004 | Eskey | |
| 2004/0091300 A1 | 5/2004 | Jang | |
| 2005/0194731 A1 | 9/2005 | Ohama et al. | |
| 2006/0071399 A1 | 4/2006 | Asada et al. | |
| 2006/0163799 A1 | 7/2006 | Goh et al. | |
| 2007/0097458 A1 | 5/2007 | Harada et al. | |
| 2007/0122225 A1 | 5/2007 | Izuchi et al. | |
| 2007/0126837 A1* | 6/2007 | Takahashi | B41J 11/007 347/104 |
| 2008/0240824 A1 | 10/2008 | Asada | |
| 2009/0026685 A1 | 1/2009 | Uchino et al. | |
| 2009/0056934 A1 | 3/2009 | Xu | |
| 2009/0065216 A1 | 3/2009 | Frazier | |
| 2009/0087239 A1 | 4/2009 | Uchino et al. | |
| 2009/0102908 A1* | 4/2009 | Imoto | B41J 13/0054 347/104 |
| 2009/0159274 A1 | 6/2009 | Frazier | |
| 2009/0189966 A1 | 7/2009 | Sugimoto et al. | |
| 2010/0231675 A1* | 9/2010 | Kato | B41J 11/007 347/104 |
| 2010/0278575 A1 | 11/2010 | Mizuno et al. | |
| 2011/0155391 A1 | 6/2011 | Scarsdale et al. | |
| 2011/0156338 A1 | 6/2011 | Samoto | |
| 2011/0157664 A1 | 6/2011 | Samoto | |
| 2011/0158725 A1 | 6/2011 | Asada et al. | |
| 2011/0188097 A1 | 8/2011 | Asada et al. | |
| 2011/0196125 A1 | 8/2011 | Wann | |
| 2011/0214881 A1 | 9/2011 | Newton et al. | |
| 2011/0291347 A1 | 12/2011 | Sano et al. | |
| 2011/0310206 A1 | 12/2011 | Samoto et al. | |
| 2011/0311294 A1 | 12/2011 | Kawamata et al. | |
| 2011/0317198 A1 | 12/2011 | Suzuki | |
| 2013/0321548 A1 | 12/2013 | Asada et al. | |
| 2014/0211274 A1 | 7/2014 | Ohta | |

FOREIGN PATENT DOCUMENTS

| | | |
|---|---|---|
| EP | 2082886 A2 | 7/2009 |
| JP | 61-78138 U | 5/1986 |
| JP | 2002-362766 A | 12/2002 |
| JP | 2006-151639 A | 6/2006 |
| JP | 2009-1412 A | 1/2009 |

OTHER PUBLICATIONS

Japanese Official Action dated Feb. 26, 2013 from related application JP 2009-299236 together with an English language translation.
Japanese Official Action dated Feb. 26, 2013 from related application JP 2009-299273 together with an English language translation.
Japanese Official Action dated Mar. 12, 2013 from related application JP 2009-299254 together with an English language translation.
United States Official Action dated Jan. 3, 2012 from related U.S. Appl. No. 12/892,400.
United States Official Action dated May 17, 2013 received in related U.S. Appl. No. 12/892,390.
Notice of Allowability dated Jun. 20, 2013 received in parent U.S. Appl. No. 12/892,377.
United States Office Action dated Nov. 28, 2012 from parent U.S. Appl. No. 12/892,377.
United States Office Action dated Jan. 11, 2013 from related U.S. Appl. No. 12/892,390.
Chinese Official Action dated Dec. 31, 2012 from related application CN 201010505634.4 together with an English language translation.
Extended European Search Report dated Feb. 7, 2013 from related application EP 10011234.1-1251.
Extended European Search Report dated Feb. 1, 2013 from related application EP 10011233.3-1251.
United States Office Action dated Nov. 15, 2012 from related U.S. Appl. No. 12/892,357.
United States Notice of Allowance dated Mar. 15, 2013 from related U.S. Appl. No. 12/892,357.
United States Official Action dated Nov. 14, 2013 from related U.S. Appl. No. 12/892,390.
United States Official Action dated Dec. 10, 2013 from related U.S. Appl. No. 13/944,655.
Notice of Allowance dated Feb. 5, 2015 received in related U.S. Appl. No. 14/319,523.
United States Office Action dated Jun. 23, 2015 from related U.S. Appl. No. 13/960,306.
Notice of Allowance dated Oct. 29, 2015 received in related U.S. Appl. No. 13/960,306.

(56) References Cited

OTHER PUBLICATIONS

Notice of Allowance dated Sep. 9, 2016 received in related U.S. Appl. No. 15/062,647.
U.S. Office Action dated Feb. 23, 2017 received in U.S. Appl. No. 14/792,002.
List of Patents or Patent Applications Treated as Related dated Jun. 30, 2017, 3 pages.

* cited by examiner

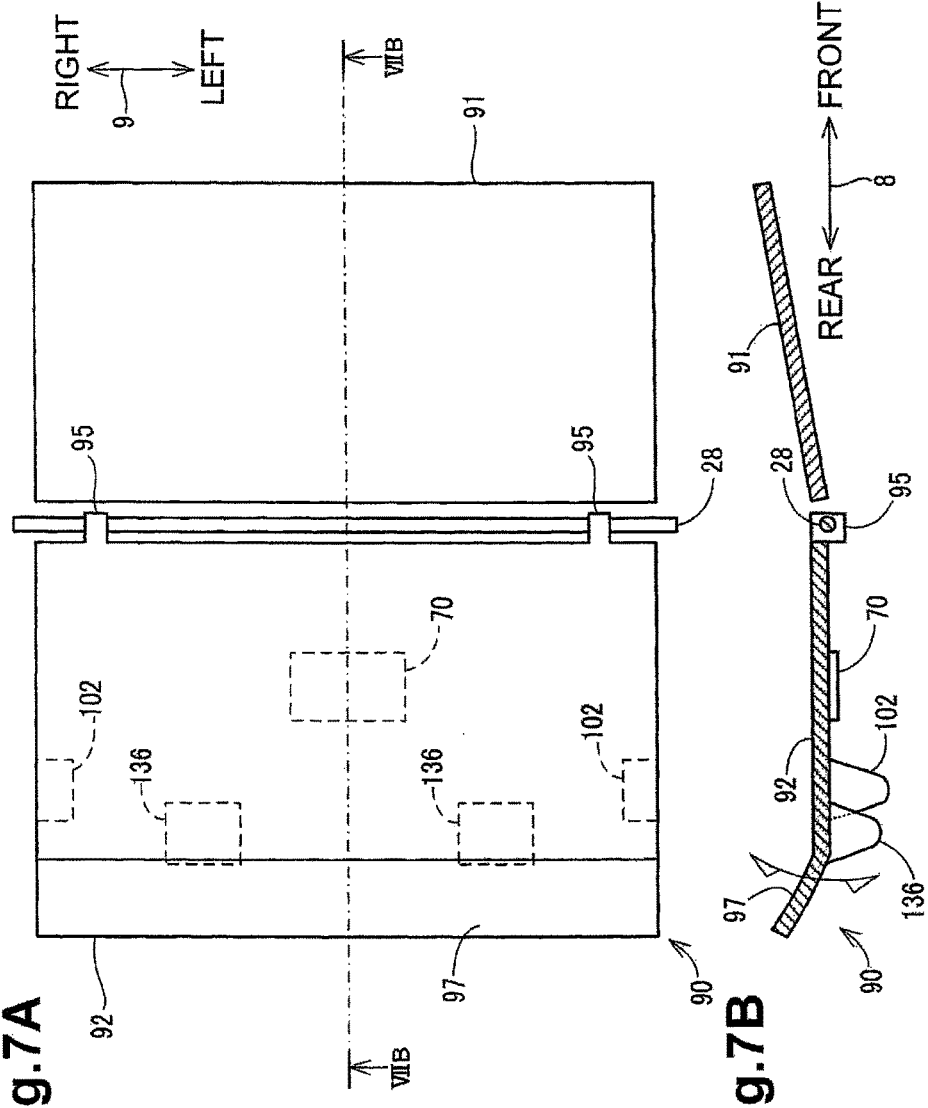

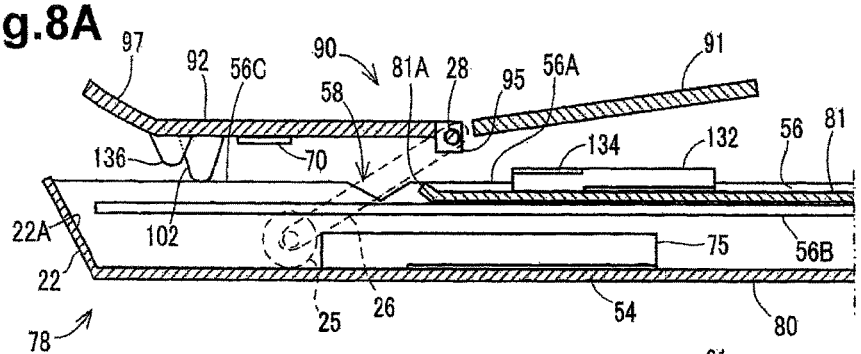

IMAGE RECORDING DEVICE

CROSS REFERENCE TO RELATED APPLICATION

This application is a continuation application of U.S. Ser. No. 15/062,647 filed on Mar. 7, 2016 which is a continuation application of U.S. Ser. No. 13/960,306 filed on Aug. 6, 2013, now U.S. Pat. No. 9,278,558 issued on Mar. 8, 2016 which is a continuation application of U.S. Ser. No. 12/892,377 filed on Sep. 28, 2010, now U.S. Pat. No. 8,508,819 issued on Aug. 13, 2013 and claims priority from Japanese Patent Application No. 2010-018605, filed on Jan. 29, 2010, the entire disclosures of which each of which are incorporated herein by reference

BACKGROUND OF THE INVENTION

1. Field of the Invention

This application relates to an image reading device configured to record an image on both sides of a sheet, and particularly to an image recording device comprising a return guide configured to convey a sheet having an image recorded thereon back to a recording unit.

2. Description of Related Art

A known image recording device is configured to record an image on both sides of a sheet and comprises a sheet tray, a feed roller, and a recording unit disposed above the sheet tray. The feed roller feeds a sheet from the sheet tray toward the recording unit via a curved path extending between the sheet tray and the recording unit. In a double-sided recording mode, a sheet having an image recorded on one side thereof is switched back and returned to the sheet tray, and the feed roller feeds the sheet again toward the recording unit via the curved path. Because a path for guiding a sheet for recording one side thereof and a path for guiding a sheet for recording the other side thereof are shared, the image recording device is made compact.

However, when the feed roller feeds the sheet returned to the sheet tray, the feed roller contacts the surface of the sheet on which an image has been recorded. The feed roller may smear the image on the sheet, or a recording agent, such as ink or toner, may adhere to the feed roller which, in turn, may soil another sheet.

SUMMARY OF THE INVENTION

A need has arisen for an image recording device that overcomes these and other shortcomings of the related art, and is configured to convey a sheet having an image recorded thereon to a recording unit without a risk that the image is damaged while the recording device remains compact.

According to an embodiment of the invention, an image reading device comprises a tray unit configured to hold sheets, a recording unit disposed above the tray unit, an outer guide defining a curved path extending from the tray unit to the recording unit, a sheet feeder configured to feed a sheet from the tray unit to the curved path in a first direction, and a return guide disposed between the recording unit and the tray unit. The return guide is configured to pivot about a shaft extending in a second direction perpendicular to the first direction and to guide the sheet having an image recorded thereon back to the curved path. The tray unit comprises at least one supporting portion. The return guide comprises at least one supported portion. The at least one supporting portion of the tray unit is configured to engage the at least one supported portion of the return guide such that the return guide takes a guiding position in which the return guide defines a return path extending to the curved path.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIG. 7A is a schematic plan view of a lower guide of the printer, and FIG. 7B is a schematic cross-sectional view of the lower guide taken along line VIIB-VIIB in FIG. 7A.

FIGS. 8A-8D are schematic cross-sectional views illustrating movements of the tray unit and a rear guide plate of the lower guide.

DETAILED DESCRIPTION OF EMBODIMENTS

Embodiments of the invention and their features and technical advantages may be understood by referring to FIGS. 1-5, like numerals being used for like corresponding parts in the various drawings.

Figure 1:
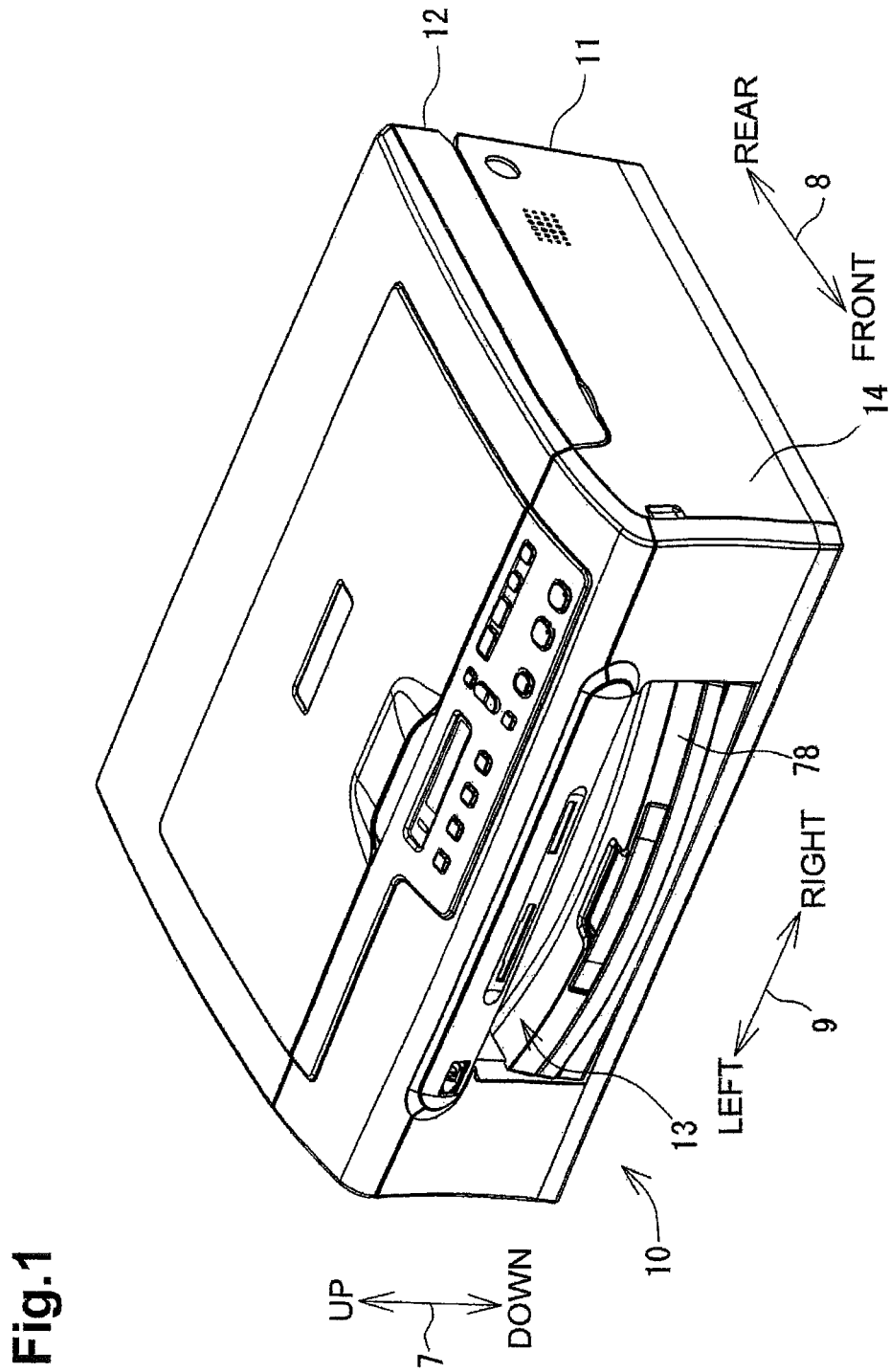
FIG. 1 is a perspective view of an image recording device, e.g., a multi-function device, according to an embodiment of the invention.

FIG. 1 is a perspective view showing the external configuration of an image recording device, e.g., a multi-function device 10, according to an embodiment of the present invention. In the following description, an up-down direction 7 will be defined on the basis of a state where the multi-function device 10 is set in a usable position (i.e., the state shown in FIG. 1), a front-rear direction 8 will be defined with a side provided with an opening 13 as being a front side (front face), and a left-right direction 9 will be defined on the basis of a state where the multi-function device 10 is viewed from the front side (front face).

As shown in FIG. 1, the multi-function device 10 substantially has a low-profile rectangular parallelepiped shape with a width (i.e., the dimension in the left-right direction 9) and a depth (i.e., the dimension in the front-rear direction 8) that are greater than the height (i.e., the dimension in the up-down direction 7). Mainly, the multi-function device 10 integrally includes an inkjet printer 11 provided at a lower section and a scanner 12 provided at an upper section. The multi-function device 10 has various functions, such as a facsimile function, a printing function, a scanning function, and a copying function. As the printing function, the multi-function device 10 has a double-sided recording function for recording images onto both sides of a recording medium, e.g., a sheet. The functions other than the printing function are optional. For example, the image recording device according to the present invention is applicable to a printer that does not have a scanning function, a copying function, and a facsimile function.

The printer 11 includes a housing 14 having the opening 13 in the front face thereof. Components of the printer 11 are disposed within the housing 14. An accommodation space extends continuously from the opening 13 toward the interior of the housing 14. A tray unit 78, is fitted in this accommodation space. The tray unit 78 is configured to be inserted into and removed from the interior of the housing 14 horizontally in the front-rear direction 8 through the opening 13. The tray unit 78 includes a first tray, e.g., a main tray 80, configured to hold sheets of various sizes, and a second tray 81 configured to slide on the main tray 80, in the front-rear direction 8. A detailed description of the configuration of the tray unit 78 will be provided later.

The printer 11 mainly includes the tray unit 78, the sheet feeder 15 that picks up a sheet from the tray unit 78, an inkjet recording unit 24 that emits ink droplets onto the sheet fed by the sheet feeder 15 so as to form an image on the sheet, a path switching unit 41, a discharge tray 79 that holds the sheet having undergone recording and discharged to the outside, and a controller that controls, for example, rotation of convey rollers included in the printer 11. These components are provided within the housing 14. The recording unit 24 is not limited to the inkjet type and may be of various recording types, such as an electrophotographic type or a thermal recording type. The discharge tray 79 may be integrated with the tray unit 78 or may be fixed to a frame or the like of the housing 14.

A convey path 65 that extends upward and frontward from a rear end of the tray unit 78 to the discharge tray 79 via the recording unit 24 is formed inside the printer 11. The sheet is guided from the tray unit 78 to the discharge tray 79 and travels along the convey path. The convey path 65 is segmented into a curved path 65A formed in a curved shape between the rear end of the tray unit 78 and the recording unit 24, and a discharge path 65B formed between the recording unit 24 and the discharge tray 79.

Figure 2:
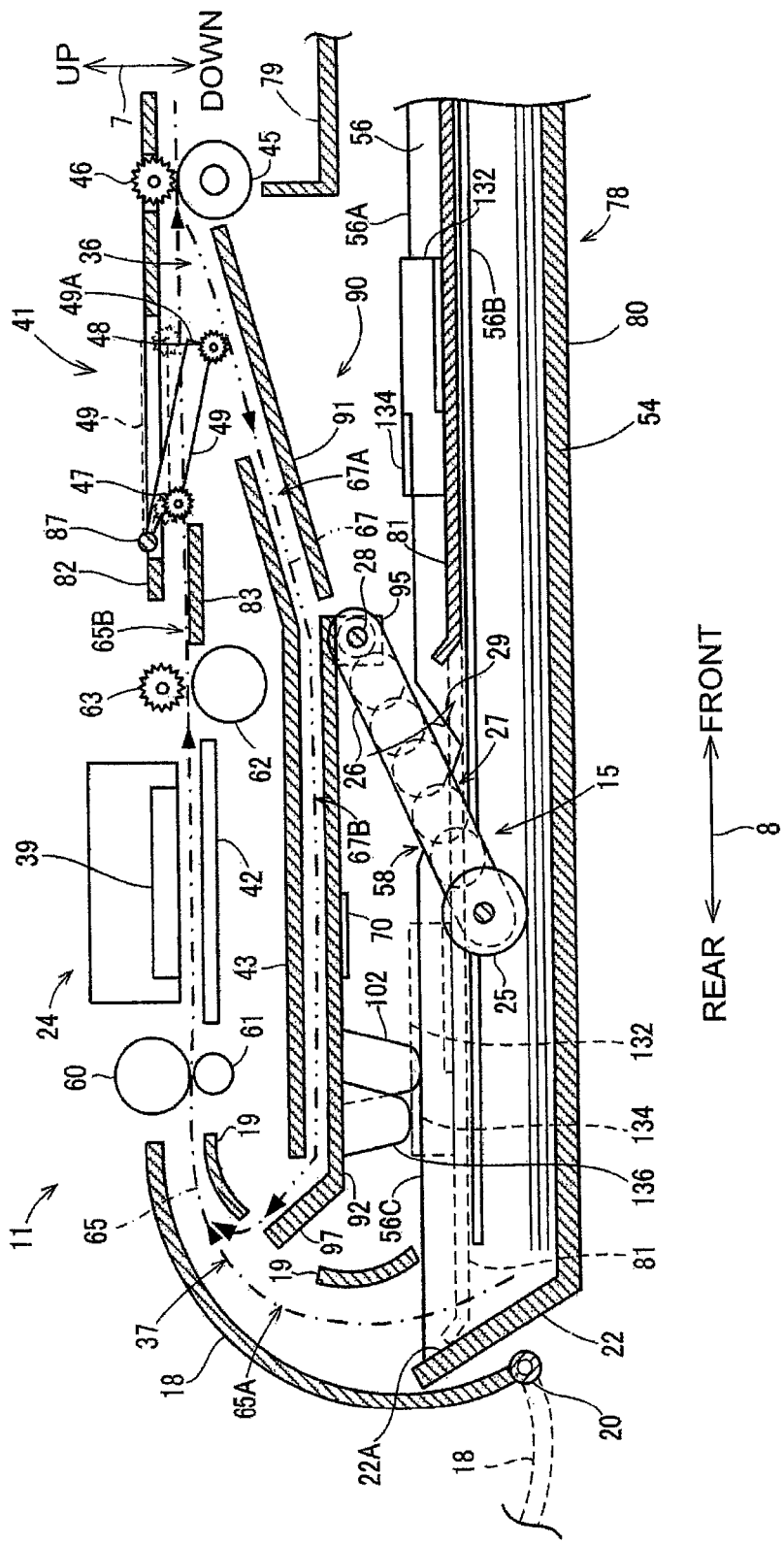
FIG. 2 is a schematic vertical cross-sectional side view of a printer of the image recording apparatus of FIG. 1.

As shown in FIG. 2, the curved path 65A extends from near an upper end of an inclined separation plate 22 provided in the tray unit 78 to the recording unit 24. The curved path 65A is defined by a rear cover 18 provided at the rear of the housing 14 and an inner guide 19 disposed facing the rear cover 18 with a predetermined distance therebetween. The rear cover 18, which serves as an outer guide, and the inner guide 19 are formed in a substantially arc shape centered on the interior of the printer 11.

The inner face of the rear cover 18 defines the curved path 65A, and the outer face of the rear cover 18 defines the rear face of the housing 14. The rear cover 18 is supported in an openable/closable manner about a shaft 20, provided at a lower portion of the housing 14, between a closed position (i.e., a position denoted by a solid line in FIG. 2) in which the rear cover 18 covers the rear face of the housing 14 and an open position (i.e., a position denoted by a dashed line in FIG. 2) in which the rear cover 18 is moved away from the housing 14 so as to expose the curved path 65A. When the rear cover 18 is set in the closed position, the inner surface thereof defines the curved path 65A. Even when the sheet is jammed in the curved path 65A, the jammed sheet can be readily accessed by simply opening the rear cover 18.

The discharge path 65B is defined by an upper discharge guide 82 and a lower discharge guide 83 that are provided to the front of the recording unit 24.

A branch port 36 is formed at the front side of the lower discharge guide 83. When performing double-sided recording, the sheet conveyed along the discharge path 65B is switched back at the downstream side of the branch port 36 so as to be conveyed toward a return path 67, to be described later.

The recording unit 24 is disposed above the tray unit 78. The recording unit 24 is configured to reciprocate along a guide rail (not shown) extending in a direction perpendicular to the drawing sheet plane of FIG. 2 (i.e., the left-right direction 9 in FIG. 1). A platen 42 is provided below the recording unit 24. When image recording is performed by the recording unit 24, the platen 42 supports the sheet in a horizontal state. In the course of a reciprocating process in the main scanning direction, the recording unit 24 emits ink supplied from an ink cartridge (not shown) as very small ink droplets through nozzles 39 toward the sheet conveyed on the platen 42. Consequently, an image is recorded onto the sheet.

The convey path 65 is provided with a first convey roller 60 and a second convey roller 62 for nipping and conveying the sheet. The recording unit 24 is provided between the first convey roller 60 and the second convey roller 62. A pinch roller 61 is disposed in pressure contact with the first convey roller 60, and a spur roller 63 is disposed in pressure contact with the second convey roller 62. In this embodiment, the first convey roller 60 and the second convey roller 62 are rotated by receiving a rotational driving force from a convey motor (not shown) via a transmission mechanism (not shown). Furthermore, a rotational driving force for rotating a third convey roller 45, to be described later, in a forward rotating direction or a reverse rotating direction is also transmitted thereto from the convey motor. Alternatively, a driving source for the first convey roller 60 and the second convey roller 62 and a driving source for the third convey roller 45 may be provided independently of each other.

The sheet feeder is provided between the recording unit 24 and the tray unit 78, more specifically, between a lower guide 90, to be described later, and the tray unit 78. The sheet feeder 15 is configured to convey sheets accommodated in the tray unit 78 to the curved path 65A and includes a feed roller 25, a feed arm 26 formed of an arm-like member, and a transmission mechanism 27.

The feed roller 25 is configured to pick up the sheets held by the tray unit 78 one by one and feed each sheet to the curved path 65A. The feed roller 25 is made of an elastic material, such as silicon or NBR, so as to increase the contact friction against the sheet. Alternatively, the feed roller 25 may be a plastic roller whose roller surface is coated with an elastic material. The feed roller 25 is rotatably supported by a free end of the feed arm 26. The feed roller 25 is rotationally driven by receiving a rotating force of a feed motor (not shown), serving as a driving source, via the transmission mechanism 27. The transmission mechanism 27 is supported by the feed arm 26 and includes a plurality of gears that are arranged substantially linearly in the extending direction of the feed arm 26.

A shaft 28 is provided between the recording unit 24 and the tray unit 78. The shaft 28 is a rod-like member extending in the left-right direction 9 of the housing 14. The feed arm 26 has its base end supported by a midsection of the shaft 28 and is pivotable about the shaft 28. Therefore, the feed arm 26 is vertically movable into and out of contact with the tray unit 78. The feed arm 26 extends obliquely downward toward the rear of the housing 14 from the pivotal center of the shaft 28. The free end of the feed arm 26 extends to an accommodation space for the tray unit 78. The feed arm 26 is pivotally biased in a direction indicated by an arrow 29 in FIG. 2 due to its own weight and/or an elastic force of an elastic member, such as a spring. The shaft 28 also serves as a shaft for pivotably supporting a rear guide plate 92, to be described later.

Figure 3:
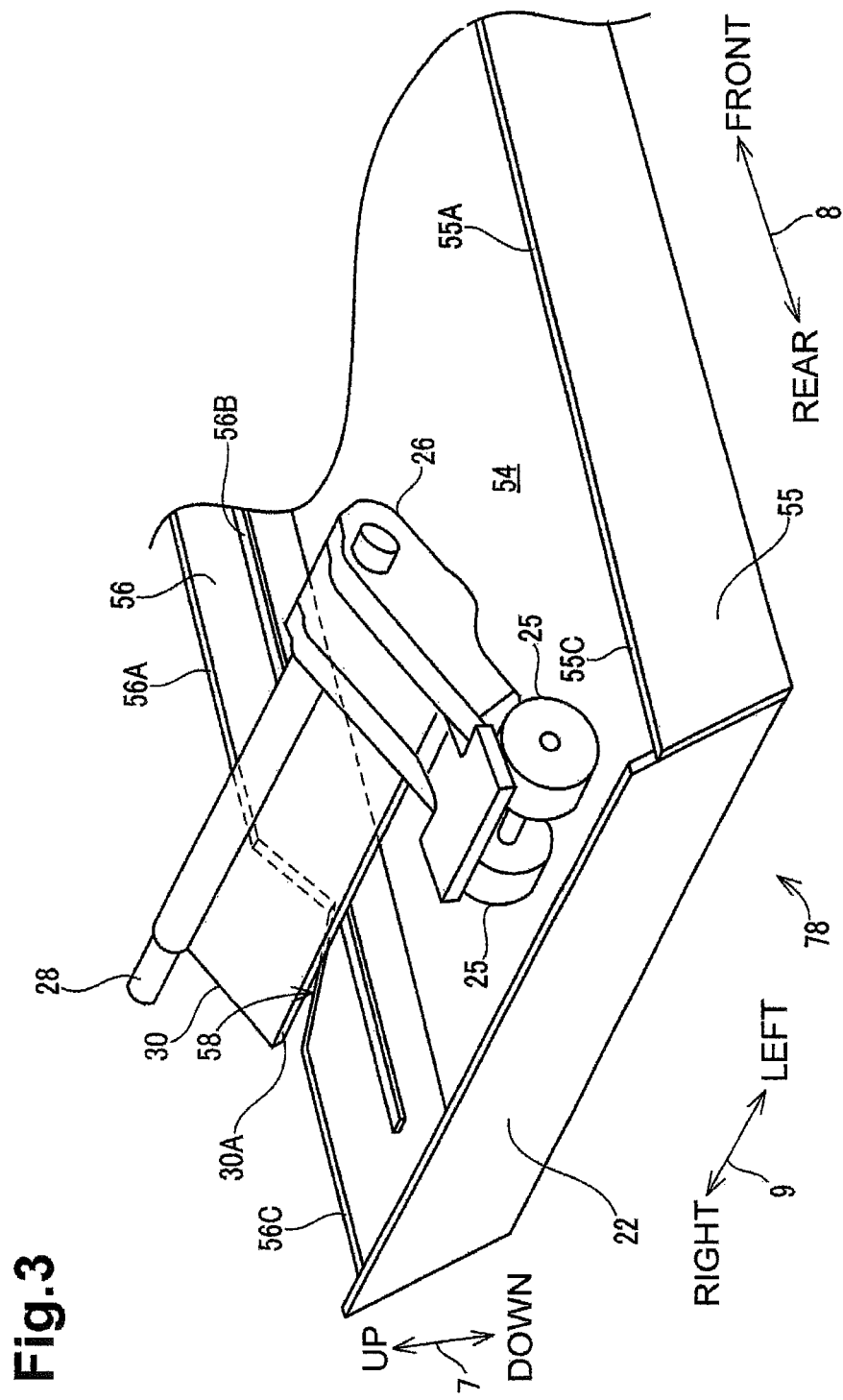
FIG. 3 is a schematic partial perspective view of a sheet feeder of the printer.

As shown in FIG. 3, the feed arm 26 includes a pivot plate 30 that extends rightward from the feed arm 26 and that is long in the left-right direction 9. The pivot plate 30 extends rightward to the exterior of the main tray 80. Similar to the feed arm 26, the pivot plate 30 is pivotable about the shaft 28. When the pivot plate 30 pivots, the feed arm 26 also pivots in the same direction. An upper end 56A of a side plate 56 of the main tray 80 has a guide surface 58 formed as a V-shaped notch. The guide surface 58 is provided at a position corresponding to the pivot plate 30 of the feed arm 26. In detail, in a state where the tray unit 78 is fitted in the housing 14, a lower end 30A of the pivot plate 30 is positioned at a lowermost part of the V-shaped guide surface 58. At this position, the feed arm 26 can pivot downward until bringing the feed roller 25 into contact with a base plate 54. In this embodiment, the pivot plate 30 is guided by the guide surface 58 during the insertion and removal of the tray unit 78 into or from the housing 14, thereby causing the feed arm 26 to pivot. Consequently, the feed roller 25 vertically moves together with the feed arm 26. The upper end 56A has a first supporting portion 56C, to be described later, that is located to the rear of the guide surface 58. The first supporting portion 56C forms a horizontal surface that is set higher than the guide surface 58. When the pivot plate 30 is supported by the first supporting portion 56C, the feed arm 26 is supported at a pivot position where the feed roller 25 is lifted to a position higher than the inclined separation plate 22.

Because the feed arm 26 and a support mechanism therefore are formed in this manner, the feed arm 26 can move up and down relative to the tray unit 78. Furthermore, when the tray unit 78 is being inserted into the housing 14, the rear end (such as the inclined separation plate 22) of the tray unit 78 comes into abutment with the pivot plate 30 so as to cause the feed arm 26 to pivot upward. Consequently, the feed roller 25 is lifted upward together with the feed arm 26. Then, when the tray unit 78 is positioned below the feed roller 25, the pivot plate 30 is fitted in the V-shaped guide surface 58, causing the feed arm 26 to pivot downward and the feed roller 25 to descend accordingly. As a result, the feed roller 25 comes into pressure contact with the upper surface of the sheets held by the tray unit 78. In this case, when the second tray 81 is set at a first position (i.e., a position denoted by a solid line in FIG. 2) at the front side, the feed arm 26 takes a position for feeding the sheets in the main tray 80 to the curved path 65A such that the feed roller 25 comes into contact with the upper surface of the sheets in the main tray 80. A right side plate 85 (see FIG. 6) of the second tray 81 has a guide surface 84 formed as a V-shaped notch and having a similar function to that of the guide surface 58. Therefore, when the second tray 81 is set at a second position (i.e., a position denoted by a dashed line in FIG. 2) at the rear side, the feed arm 26 takes a position for feeding the sheets in the second tray 81 to the curved path 65A such that the feed roller 25 comes into contact with the upper surface of the sheets in the second tray 81. On the other hand, when the tray unit 78 is being removed from the housing 14, the feed roller 25 is temporarily lifted upward together with the feed arm 26 by the guide surface 58 so as not to collide with the inclined separation plate 22. Then, after the feed roller 25 moves over the inclined separation plate 22, the feed arm 26 is no longer supported by the tray unit 78, causing the feed roller 25 to descend together with the feed arm 26 as if falling from the tray unit 78.

The frame of the housing 14 is provided with a stopper 71 (see FIG. 8D) for preventing the feed roller 25 from coming into contact with the bottom face of the housing 14 even after the tray unit 78 is removed from the housing 14. When the tray unit 78 is not fitted in the housing 14, the stopper 71 is in abutment with the feed arm 26 and prevents the feed arm 26 from pivoting downward such that the feed roller 25 does not move lower than a predetermined position distant from the bottom face of the housing 14.

As shown in FIG. 2, the tray unit 78 is provided below the sheet feeder 15 and includes the main tray 80 and the second tray 81.

The main tray 80 is configured to accommodate letter-size (216 mm×274 mm), legal-size (216 mm×356 mm), and A4-size (210 mm×297 mm) sheets. In the multi-function device 10 according to this embodiment, A4-size or B5-size sheets are mainly accommodated in the main tray 80.

Figure 4:
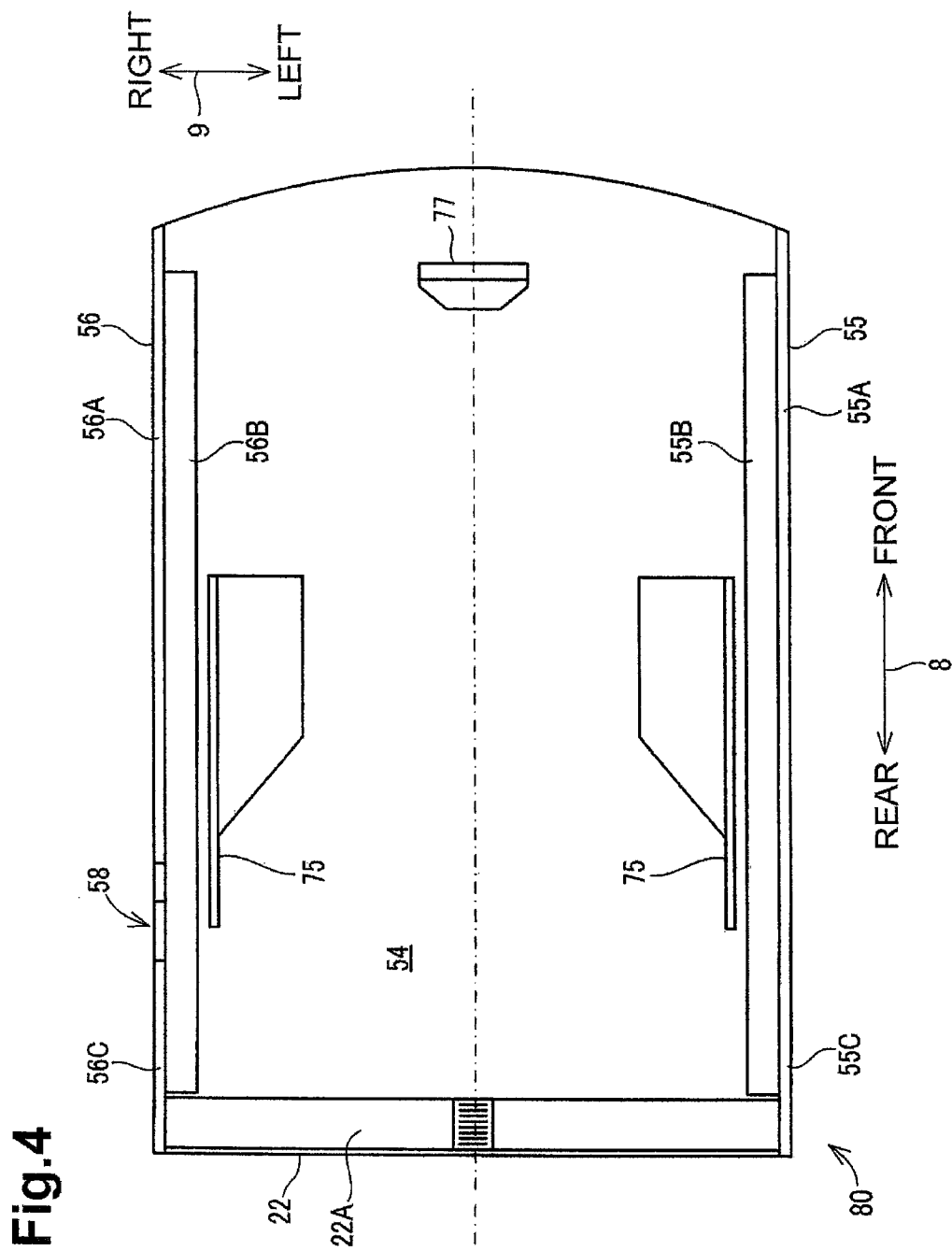
FIG. 4 is a schematic plan view of a main tray of a tray unit of the printer.

As shown in FIG. 4, the main tray 80 includes the base plate 54 on which the sheets are placed, side plates 55 and 56 standing upright from opposite ends of the base plate 54 in the left-right direction 9 and extending in the front-rear direction 8, and the inclined separation plate 22 standing on the rear end of the base plate 54 and extending in the left-right direction 9. The main tray 80 has a shape of a substantially rectangular box whose upper surface is open. The inclined separation plate 22 is inclined rearward so as to allow for smooth feeding of the sheets.

As shown in FIG. 3, opposite ends of the main tray 80 in the left-right direction 9, which is a widthwise direction of the tray unit 78, include first supporting portions 55C and 56C, respectively. The first supporting portion 56C is a portion of the upper end 56A of the right side plate 56 and is located to the rear of the guide surface 58. The first supporting portion 55C is a portion of an upper end 55A of the left side plate 55 and is located opposite to the first supporting portion 56C in the left-right direction 9. The first supporting portion 55C is integrated with the side plate 55. The first supporting portion 56C is integrated with the side plate 56. The first supporting portions 55C and 56C function together with projections 102, to be described later.

Figure 5:
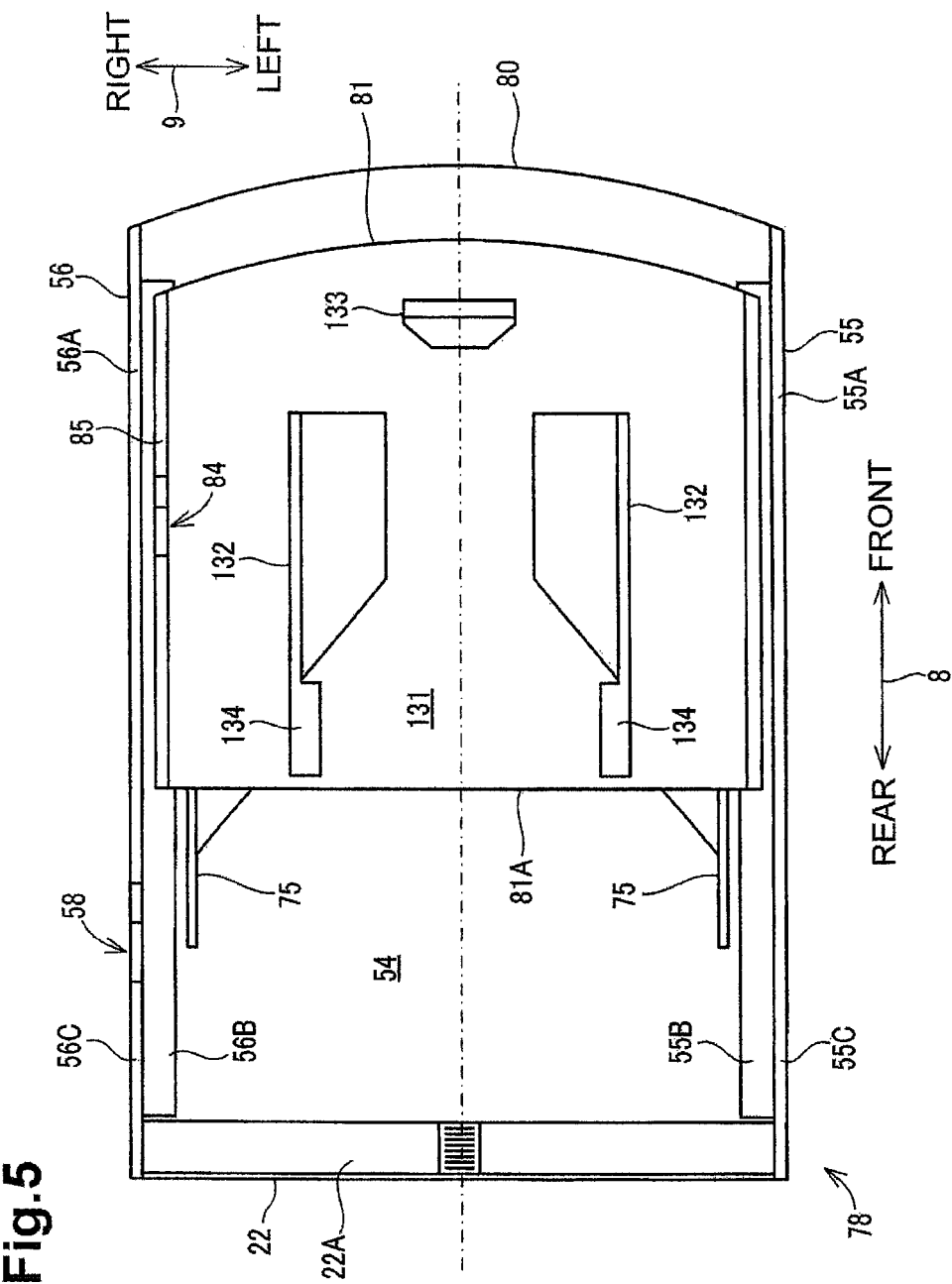
FIG. 5 is a schematic plan view of the tray unit.

As shown in FIG. 5, the side plate 55 includes a plate-like support rail 55B that protrudes toward the side plate 56 from the inner surface of the side plate 55. Similarly, the side plate 56 includes a plate-like support rail 56B that protrudes toward the side plate 55 from the inner surface of the side plate 56. The support rails 55B and 56B extend in the front-rear direction 8. The second tray 81, to be described later, is supported in a slidable manner in the front-rear direction 8 by these support rails 55B and 56B.

The main tray 80 includes a pair of side guides 75 extending on the base plate 54 in the front-rear direction 8. The main tray 80 includes a known mechanism that interlocks the side guides 75. Therefore, for example, when one of the side guides 75 is slid toward one side (rightward) in the left-right direction 9, the other side guide 75 is driven in conjunction with this sliding operation so as to be slid toward the opposite side (leftward). Consequently, if the width of the sheets placed on the base plate 54 is smaller than the distance between the side guides 75, the side guides 75 are slid toward the opposite edges of the sheets so as to bring the side guides 75 into abutment with the opposite edges of the sheets. Thus, a center position of the sheets in the width direction thereof (i.e., the left-right direction 9) can be substantially aligned with the center of the main tray 80 in the width direction thereof. Even when sheets having a size smaller than the width of the main tray 80 are placed thereon, the sheets are positioned in the middle of the main tray 80 by the side guides 75. Alternatively, a single side guide may be provided. In that case, the sheets is positioned between the side guide and one of the side plates 55 and 56.

Furthermore, a rear guide 77 is supported on the base plate 54 in a slidable manner in the front-rear direction 8. Therefore, by sliding the rear guide 77 toward the rear edges of the sheets placed on the main tray 80, the sheets are pushed toward the rear side of the main tray 80.

Figure 6:
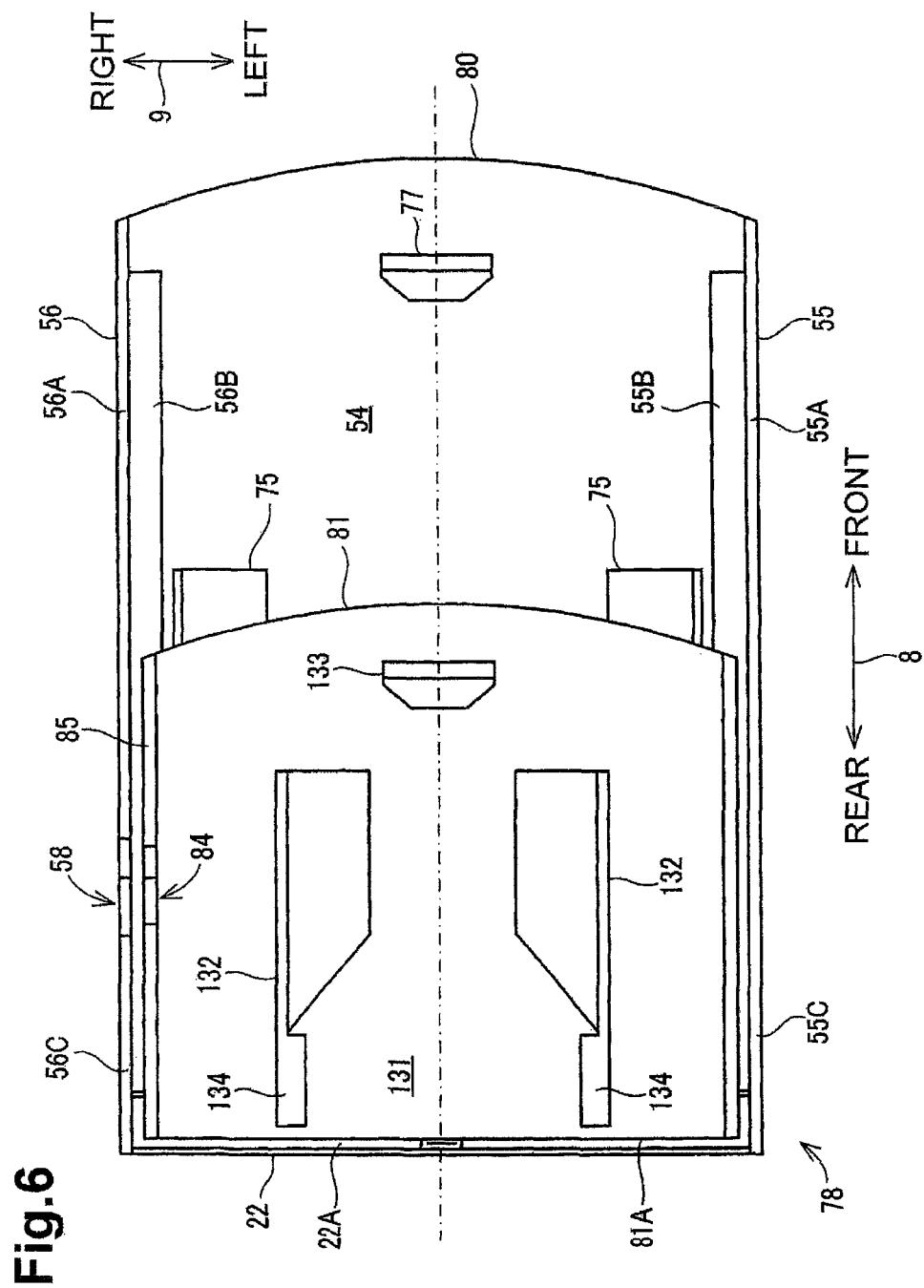
FIG. 6 is a schematic plan view of the tray unit.

FIGS. 5 and 6 are plan views schematically showing the configuration of the tray unit 78. As shown in FIGS. 5 and 6, the second tray 81 is provided in the upper portion of the main tray 80. The second tray 81 is a flat rectangular member designed such that the dimension thereof in the left-right direction 9 is slightly smaller than the dimension of the main tray 80 in the left-right direction 9 and that the dimension thereof in the front-rear direction 8 is somewhat smaller than the dimension of the main tray 80 in the front-rear direction 8. A sheet holding portion 131 is provided in the middle of the second tray 81 in the left-right direction 9. This sheet holding portion 131 accommodates the sheets. In this embodiment, the sheet holding portion 131 is designed so as to have a width that is smaller than that of a sheet holding surface of the main tray 80, and is configured to hold postcard-size (e.g., with a short side of 90-107 mm×a long side of 140-154 mm) sheets at the largest. The sheet holding portion 131 mainly accommodates postcard-size or L photo-size (89 mm×127 mm) sheets (such as postcards and glossy paper).

The sheet holding portion 131 of the second tray 81 includes a pair of side guides 132 extending in the front-rear direction 8 and a rear guide 133 supported in a slidable manner in the front-rear direction 8. The side guides 132 and the rear guide 133 are substantially similar to the side guides 75 and the rear guide 77 of the main tray 80. However, the pair of side guides 132 include second supporting portions 134, respectively. The second supporting portions 134 are spaced from each other in the left-right direction 9, which is the widthwise direction of the tray unit 78. The second supporting portions 134 are integrated with the respective side guides 132. The second supporting portions 134 are plate members extending from the upper ends of the respective side guides 132 toward the middle of the second tray 81 in the width direction thereof. The two second supporting portions 134 functions together with protrusions 136, to be described later. Alternatively, a single side guide may be provided. In that case, a side plate may be provided along one end of the second tray 81 in the left-right direction 9 such that the sheets are positioned between this side plate and the side guide.

The second tray 81 is supported by the aforementioned support rails 55B and 56B of the main tray 80. In detail, the opposite ends of the second tray 81 in the left-right direction 9 are respectively supported by the upper surfaces of the support rails 55B and 56B. The second tray 81 is supported in a movable manner in the main tray 80 so as to slide in the front-rear direction 8. The second tray 81 is slidable between the second position (see FIG. 6) at which a rear end 81A thereof is in abutment with an inner surface 22A of the inclined separation plate 22 so that the second tray 81 is adjacent to the curved path 65A, and the first position (see FIG. 5) at which the rear end 81A is distant from the inclined separation plate 22 toward the front side by a predetermined distance.

The support mechanism for the second tray 81 is not limited to the support rails 55B and 56B extending in the front-rear direction 8, as described above, and may be of any kind so long as the support mechanism can support the second tray 81 in a movable manner in the front-rear direction 8 in the main tray 80.

When the second tray 81 is set in the first position, the rear-side upper surface of the main tray 80 is open. In this state, the feed roller 25 descends toward the main tray 80 through the opening in the rear-side upper surface of the main tray 80 so as to come into contact with the sheets held by the main tray 80. When the feed roller 25 rotates in this state, the sheets held by the main tray 80 are fed one-by-one toward the curved path 65A.

On the other hand, when the second tray 81 is slid from the first position to the second position, the rear end 81A of the second tray 81 pushes the pivot plate 30 upward during the sliding process. This causes the feed arm 26 to be pushed upward, whereby the feed roller 25 is positioned on the second tray 81. When the feed roller 25 is positioned on the second tray 81, the feed roller 25 comes into contact with the upper surface of the sheets held by the second tray 81. When the feed roller 25 rotates in this state, the sheets held by the second tray 81 are fed one-by-one toward the curved path 65A.

As shown in FIG. 2, the path switching unit 41 is disposed near the branch port 36 in the convey path 65. The path switching unit 41 includes a third convey roller 45, a spur roller 46, and a flap 49.

The third convey roller 45 is provided at the downstream side of the lower discharge guide 83. The branch port 36 is formed between the third convey roller 45 and the lower discharge guide 83. The third convey roller 45 is rotatably supported by the frame or the like of the housing 14. The spur roller 46 is disposed above the third convey roller 45 and is in pressure contact with a roller surface of the third convey roller 45 due to its own weight and/or a spring or the like. The spur roller 46 is rotatably supported by a downstream end of the upper discharge guide 82. The third convey roller 45 receives a driving force in the forward rotating direction or the reverse rotating direction from the convey motor so as to be rotationally driven in the forward rotating direction or the reverse rotating direction. For example, in the single-sided recording mode, the third convey roller 45 is rotationally driven in the forward rotating direction. Thus, the sheet is nipped between the third convey roller 45 and the spur roller 46 and is discharged onto the discharge tray 79 at the front side. On the other hand, in the double-sided recording mode, the rotating direction of the third convey roller 45 is switched from the forward rotating direction to the reverse rotating direction while the trailing edge of the sheet is nipped between the third convey roller 45 and the spur roller 46.

A shaft 87 extending in the direction perpendicular to the drawing sheet plane of FIG. 2 (i.e., the left-right direction 9) is provided in the frame or the like of the housing 14. The flap 49 extends substantially downstream from the shaft 87. The flap 49 is pivotably supported by the shaft 87. The flap 49 supports a spur roller 47 and a spur roller 48 that are separated from each other in the extending direction of the flap 49. The flap 49 is positionally changeable and is pivotable between a discharge position (i.e., a position denoted by a dashed line in FIG. 2) in which the flap 49 is positioned higher than the lower discharge guide 83, and a reverse position (i.e., a position denoted by a solid line in FIG. 2) in which a protruding end 49A of the flap 49 is positioned lower than the branch port 36. Because such a flap 49 is provided, when the trailing edge of the sheet passes the flap 49 and the flap 49 is subsequently set in the reverse position, the trailing edge of the sheet is oriented downward of the branch port 36. When the third convey roller 45 subsequently rotates in the reverse direction, the sheet is switched back toward the return path 67.

The return path 67 is formed inside the printer 11. The return path 67 branches off from the branch port 36 of the discharge path 65B and extends rearward through between the recording unit 24 and the sheet feeder 15 so as to merge with a merge point 37 located at an intermediate position of the curved path 65A. The return path 67 is segmented into an inclined path 67A at the front side, and a horizontal path 67B at the rear side. The sheet switched back at the path switching unit 41 travels along the return path 67 back to the curved path 65A. The return path 67 is formed by an upper stationary guide plate 43 fixed to the housing 14 and by the lower guide 90, to be described below.

As shown in FIG. 2, the lower guide 90 is provided between the recording unit 24 and the tray unit 78, more specifically, above the sheet feeder 15. The lower guide 90 includes a front guide plate 91 disposed to the front of the shaft 28 and a rear guide plate 92 disposed to the rear of the shaft 28. The lower guide 90 guides the sheet having an image recorded thereon back to the curved path 65A.

FIGS. 7A and 7B schematically illustrate the configuration of the lower guide 90. FIGS. 7A and 7B illustrate a state where the rear guide plate 92 is set in a horizontal position. The front guide plate 91 and the rear guide plate 92 are each formed of a flat-plate member having a width in the left-right direction that is substantially the same as the width of the tray unit 78.

As shown in FIG. 2, the front guide plate 91 has an inclined surface that is inclined downward and rearward from the branch port 36. A front portion of the upper stationary guide plate 43 is disposed facing the front guide plate 91 with a predetermined distance therebetween through which the sheet can pass. The inclined path 67A of the return path 67 is defined by the front guide plate 91 and the front portion of the upper stationary guide plate 43.

The rear guide plate 92 includes bearings 95 at opposite end portions in the left-right direction 9 of the front end thereof. The bearings 95 has shaft holes (not shown) through which the shaft 28 extends. Thus, the rear guide plate 92 is pivotable about the shaft 28 while the rear end of the rear guide plate 92 is a free end. Specifically, the rear guide plate 92 and the feed arm 26 are pivotably supported by the same shaft 28. As described later, the rear guide plate 92 is configured to pivot relative to the feed arm 26 in response to the insertion and removal of the tray unit 78. Although the rear guide plate 92 and the feed arm 26 are pivotably supported by the same shaft 28, a pivot shaft different from the shaft 28 may be provided for pivotably supporting the rear guide plate 92.

The rear guide plate 92 includes on the lower surface thereof a pair of projections 102 respectively provided at the opposite ends in the left-right direction 9, and a pair of protrusions 136 provided in the midsection in the left-right direction 9 and separated from each other by a predetermined distance in the left-right direction 9. The projections 102 and the protrusions 136 are located on a free end side of the rear guide plate 92.

The projections 102 protrude downward from the lower surface of the rear guide plate 92 and function as supported portions. The projections 102 may be integrally formed with the lower surface of the rear guide plate 92. When the tray unit 78 is fitted in the housing 14, the projections 102 are engaged with the aforementioned first supporting portions 55C and 56C so as to be supported from below. Specifically, the projections 102 and the first supporting portions 55C and 56C are provided at positions corresponding to each other so as to be engageable with each other. Thus, as shown in FIG. 2, the rear guide plate 92 is supported by the main tray 80 so as to be set in a guiding position, whereby the horizontal path 67B extending from the shaft 28 to the merge point 37 is formed by the rear guide plate 92. In other words, when the tray unit 78 is fitted in the housing 14, the lower guide 90 forms the return path 67 for guiding the sheet to the curved path 65A. The position of the rear guide plate 92 in this state is a position in which the sheet is guided to the curved path 65A. Such a position will be referred to as a "guiding position" hereinafter.

The protrusions 136 protrude downward from the lower surface of the rear guide plate 92 and function as supported portions. The protrusions 136 may be integrally formed with lower surface of the rear guide plate 92. The protrusions 136 are provided closer to the center in the left-right direction 9 than the pair of projections 102. When the tray unit 78 is fitted in the housing 14 and the second tray 81 is set in the aforementioned second position (i.e., the position shown in FIG. 6), the protrusions 136 are engaged with the aforementioned second supporting portions 134 so as to be supported from below. Specifically, the protrusions 136 and the second supporting portions 134 are provided at positions corresponding to each other so as to be engageable with each other. Thus, as shown in FIG. 2 with a dashed line, when the second tray 81 is set in the second position, the rear guide plate 92 is supported by the second tray 81 so as to be set in the guiding position. The horizontal path 67B extending from the shaft 28 to the merge point 37 is formed by the rear guide plate 92. At this time, the rear guide plate 92 is also supported by the main tray so as to be set in the guiding position. As shown in FIG. 7A, the protrusions 136 each have a certain amount of width in the left-right direction 9. This enables the second supporting portions 134 to support the protrusions 136 even when the side guides 132 are slid in the left-right direction 9 on the second tray 81. Therefore, each of the protrusions 136 is given a width that corresponds to the slidable width of the corresponding side guide 132.

An inclined portion 97 that is inclined rearward and upward is formed at the rear end of the rear guide plate 92. The inclined portion 97 overlaps the curved path 65A at the merge point 37. Therefore, the sheet conveyed rearward horizontally from the horizontal path 67B becomes oriented upward by the inclined portion 97. Consequently, the sheet traveling from the horizontal path 67B is conveyed smoothly toward the curved path 65A.

The rear guide plate 92 also includes on the lower surface thereof a cleaning pad 70. The cleaning pad 70 is provided in an area where the lower surface of the rear guide plate 92 comes into contact with the feed roller 25. Specific examples of the cleaning pad 70 include a felt member, a cork member, nonwoven cloth, and an adhesive resin member. By the contact of the cleaning pad of 70 with the roller surface of the feed roller 25, the cleaning pad 70 removes foreign matter from the roller surface of the feed roller 25.

FIGS. 8A to 8D are schematic cross-sectional views for explaining the movements of the rear guide plate 92. Specifically, FIG. 8A illustrates a state where the tray unit 78 with the second tray 81 set in the first position (see FIG. 5) is fitted in the housing 14, FIG. 8B illustrates a state where the rear guide plate 92 is no longer supported by the first supporting portions 55C and 56C and is beginning to descend, FIG. 8C illustrates a state where the rear guide plate 92 is pushed upward by the feed roller 25, and FIG. 8D illustrates the positions of the rear guide plate 92 and the feed roller 25 when the tray unit 78 has been removed from the housing 14.

As shown in FIG. 8A, when the tray unit 78 is fitted in the housing 14, the projections 102 of the rear guide plate 92 are supported by the first supporting portions 55C and 56C of the main tray 80. Thus, the rear guide plate 92 is set in the guiding position, and the horizontal path 67B is formed by the rear guide plate 92. At this time, since the second tray 81 is set in the first position (see FIG. 5), the protrusions 136 of the rear guide plate 92 are not supported. In this state, the printer 11 is enabled to feed the sheets from the main tray 80 of the tray unit 78. As mentioned above, the main tray 80 holds A4-size or B5-size sheets (commonly known as plain paper) that are thinner and larger than postcards or the like. Even when one of these sheets is bent by a large extent while being conveyed along the return path 67 toward the curved path 65A, the restoring force of the sheet, which is a force thereof that tries to restore its original state, is relatively small. Therefore, a downward pressing force generated by the restoring force of the sheet and applied on the rear guide plate 92 is relatively small. Consequently, the rear guide plate 92 is prevented from being bent downward by this pressing force.

When the tray unit 78 is pulled out from the state shown in FIG. 8A, the projections 102 are no longer supported by the first supporting portions 55C and 56C, thereby causing the rear guide plate 92 to pivot downward (see FIG. 8B). In the state shown in FIG. 8B, the feed roller 25 is lifted upward by the guide plate 30 guided by the guide surface 58. When the roller surface of the feed roller 25 reaches above the upper end of the inclined separation plate 22, the roller surface comes into contact with the cleaning pad 70. At this time, the cleaning pad 70 removes foreign matter in the contact area of the roller surface.

When the tray unit 78 is pulled out further, the feed roller 25 is lifted upward to move beyond the inclined separation plate 22, as shown in FIG. 8C. Thus, the rear guide plate 92 once pivoted downward (see FIG. 8B) pivots upward again (see FIG. 8C).

When the tray unit 78 is pulled out even further and the tray unit 78 is moved away from the rear guide plate 92, as shown in FIG. 8D, the feed roller 25 moves downward and the rear guide plate 92 pivots downward to follow the movement of the feed roller 25.

When the tray unit 78 is inserted into the housing 14 in the reverse sequence from a state shown in FIG. 8D to a state shown in FIG. 8A, the pivot plate 30 (see FIG. 3) cooperates with the guide surface 58 to prevent the tray unit 78 from colliding with the feed roller 25, the projections 102, and the protrusions 136.

The state of the rear guide plate 92 supported by the tray unit 78 when the second tray 81 is set in the second position (see FIG. 6) will be described with reference to FIGS. 9A, 9B, and 10.

Figure 9A:
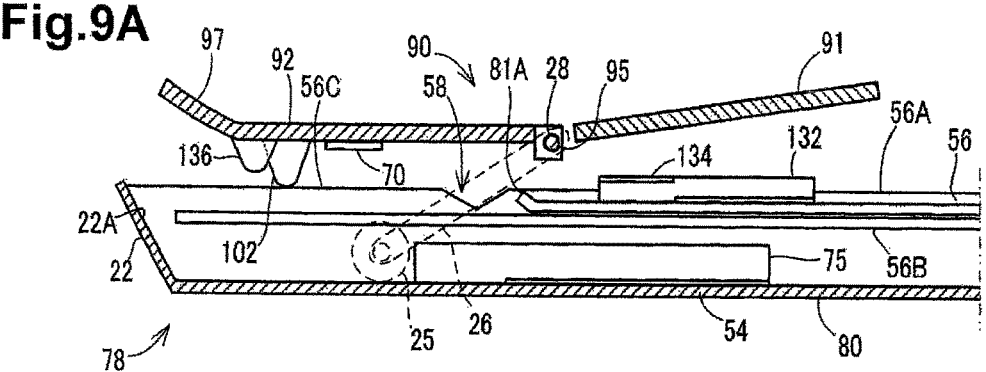
FIG. 9A is a schematic cross-sectional view illustrating the rear guide plate supported by the tray unit with a second tray in a first position.
Figure 9B:
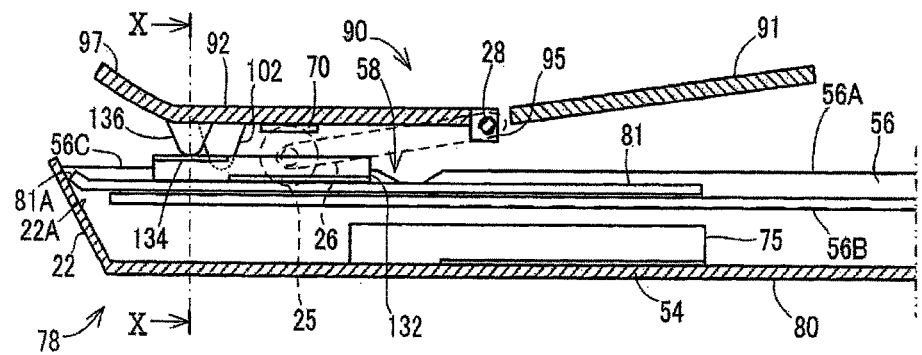
FIG. 9B is a schematic cross-sectional view illustrating the rear guide plate supported by the tray unit with the second tray in a second position.
Figure 10:
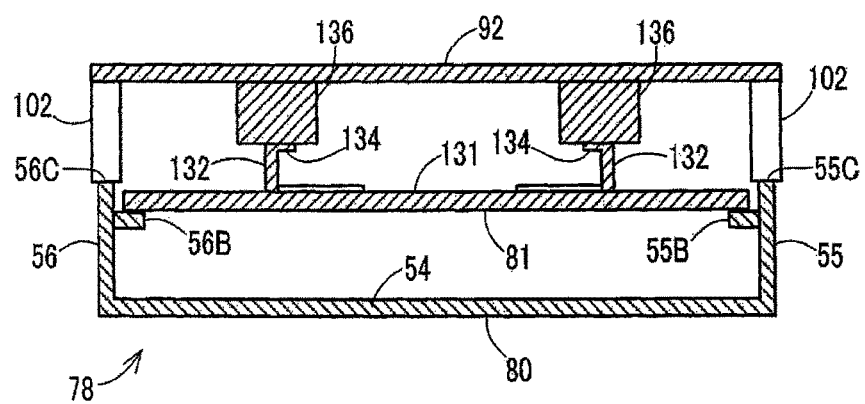
FIG. 10 is a schematic cross-sectional view of the rear guide plate and the tray unit taken along line X-X in FIG. 9B.

As shown in FIG. 9A, when the tray unit 78 is fitted in the housing 14 while the second tray 81 is set in the first position, the protrusions 136 of the rear guide plate 92 are not supported, as mentioned above, and only the projections 102 are supported by the first supporting portions 55C and 56C of the main tray 80. When the second tray 81 is slid on the main tray 80 from the first position to the second position from this state, the feed arm 26 is pushed upward by the second tray 81 being slid, causing the feed roller 25 to be lifted onto the second tray 81 together with the feed arm 26. Then, when the second tray 81 reaches the second position, the protrusions 136 of the rear guide plate 92 is supported by the second supporting portions 134 of the second tray 81 while the guiding position of the rear guide plate 92 is maintained. At this time, the rear guide plate 92 is supported at four support points that are separated from each other by predetermined distances in the left-right direction 9 (see FIG. 10). The protrusions 134 are located in more inner positions than the projections 102 in the left-right direction 9, i.e., the widthwise direction of the tray unit 78. The second supporting portions 134 are located in more inner positions than the first supporting portions 55C and 56C in the left-right direction 9.

As mentioned above, the second tray 81 holds postcards or sheets of glossy paper that are thicker and smaller than A4-size or B5-size plain paper. When one of these sheets is conveyed along the return path 67 toward the curved path 65A, the sheet is bent by a large extent. In this case, the restoring force of the sheet, which is a force thereof that tries to restore its original state, is greater than that of the aforementioned plain paper. Therefore, a downward pressing force generated by the restoring force of the sheet and applied on the rear guide plate 92 is also greater. When the rear guide plate 92 is designed to have a reduced thickness in order to reduce the height dimension of the multi-function device 10, there is a possibility that the rear guide plate 92 may be bent downward due to the aforementioned pressing force. However, when the sheet is fed from the second tray 81, the rear guide plate 92 is prevented from being bent downward because the rear guide plate 92 is supported at the four support points separated from each other by predetermined distances in the left-right direction 9 (see FIG. 10), and especially because the pressing force is received by the two support points that support the midsection of the rear guide plate 92.

With the above-described configuration, the return path 67 defined by the lower guide 90 guides the sheet having passed the recording unit 24 to the curved path 65A. After the tray unit 78 is removed from the housing 14, the rear guide plate 92 is no longer supported by the tray unit 78, whereby the rear guide plate 92 pivots downward. Consequently, the horizontal path 67B is enlarged. Therefore, even when the sheet is jammed in the return path 67, the jammed sheet is readily accessed and removed by opening the rear cover 18.

When the second tray 81 is set in the second position (see FIG. 6), the opposite ends of the rear guide plate 92 are supported by the first supporting portions 55C and 56C of the main tray 80, and the midsection of the rear guide plate 92 is supported by the second supporting portions 134 of the second tray 81. Therefore, even when the sheet entering the curved path 65A from the return path 67 is bent by a relatively large extent and the restoring force thereof is applied downward onto the rear guide plate 92, the rear guide plate 92 is prevented from being bent downward. This prevents sheet conveyance failure and sheet jams in the return path 67.

Although the projections 102 are provided in the rear guide plate 92 in the above-described embodiment, projections may be provided on the side plates 55 and 56 of the tray unit 78 in place of the projections 102. Furthermore, although the rear guide plate 92 is supported at the four support points when the second tray 81 is set in the second position in the above-described embodiment, a two-point support structure may be used. The opposite ends in the left-right direction 9 of the rear guide plate 92 may be unsupported in a floating manner, and only the midsection of the rear guide plate 92 may be supported by the engagement of the protrusions 136 and the second supporting portions 134.

Furthermore, although the above-described embodiment employs a mechanism that vertically moves the feed arm 26 and the feed roller 25 by using the first supporting portion 56C, the guide surface 58, and the pivot plate 30, the present invention is not limited to such a configuration. The present invention is applicable to any kind of configuration having a mechanism that vertically moves the feed arm 26 and the feed roller 25 in conjunction with the insertion and removal of the tray unit 78.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image recording device comprising:
   a first tray including a first sheet support plate configured to support sheets thereon;
   a second tray including a second sheet support plate configured to support sheets thereon, the second tray being configured to move, relative to the first tray, between a first position and a second position;
   a sheet feeder configured to feed a sheet selectively from the first tray and the second tray, the sheet feeder including:
      a feed arm pivotable about a pivot shaft passing through one end portion thereof: and
      a feed roller supported by the other end portion of the feed arm, the feed roller being configured to, when the second tray is at the first position, contact the first sheet support plate and configured to, when the second tray is at the second position, contact the second sheet support plate;
   a recording unit configured to record an image on the sheet fed by the sheet feeder;
   a return guide including:
      a first surface defining a part of a return path and configured to guide the sheet having the image recorded thereon along the return path back toward the recording unit;
      a second surface opposite to the first surface; and
      a support portion extending from the second surface and supporting the pivot shaft for the feed arm, and
   a cover including a curved guide surface and movable between a non-exposing position at which the curved guide surface defines a part of a curved path and guides the sheet fed by the sheet feeder toward the recording unit along the curved path, and an exposing position at which the cover exposes a part of the return guide,
   wherein when the second tray is at the second position, the sheet feeder is located between the second surface of the return guide and the second sheet support plate of the second tray.

2. The image recording device according to claim 1, wherein the first surface of the return guide is configured to guide the sheet having the image recorded thereon along the return path in a return direction, and
   wherein the cover is configured to, when at the exposing position, expose a downstream end of the return guide in the return direction.

3. The image recording device according to claim 1, wherein the curved guide surface of the cover is configured to, when the cover is at the non-exposing position, guide the sheet guided by the return guide toward the recording unit.

4. The image recording device according to claim 1, wherein the return path is connected to the curved path when the cover is at the non-exposing position.

5. The image recording device according to claim 1, wherein the first surface of the return guide includes a horizontal portion extending parallel to the second sheet support plate of the second tray.

6. The image recording device according to claim 5, wherein the horizontal portion of the first surface of the return guide is located between the recording unit and the sheet feeder.

7. The image recording device according to claim 1, wherein the curved guide surface of the cover is configured to invert the sheet fed by the sheet feeder and the sheet guided by the first surface of the return guide.

8. The image recording device according to claim 1, wherein the return guide is pivotable about an axis parallel to the pivot shaft for the feed arm.

9. The image recording device according to claim 1, wherein the second tray is supported by the first tray.

10. The image recording device according to claim 1, wherein the second tray is configured to, when at the second position, support the return guide.

11. The image recording device according to claim 1, further comprising a sheet separator configured to separate from other sheets, the sheet fed by the sheet feeder selectively from the first tray and the second tray, wherein the curved guide surface is configured to, when the cover is at the non-exposing position, guide the sheet separated by the sheet separator toward the recording unit.

* * * * *